United States Patent
Kaufman et al.

(10) Patent No.: US 11,893,401 B1
(45) Date of Patent: Feb. 6, 2024

(54) REAL-TIME EVENT STATUS VIA AN ENHANCED GRAPHICAL USER INTERFACE

(71) Applicant: Capital One Services, LLC, McLean, VA (US)

(72) Inventors: Brian P. Kaufman, McLean, VA (US); Eun Young Choe, Hanover, MD (US); Sabrina Colaianni, Rockville, MD (US); Reza Zandinejad, Aldie, VA (US); Shaya Philip Rubenstein, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/062,476

(22) Filed: Dec. 6, 2022

(51) Int. Cl.
  *G06F 9/451* (2018.01)
  *G06F 16/957* (2019.01)

(52) U.S. Cl.
  CPC .......... *G06F 9/451* (2018.02); *G06F 16/9577* (2019.01)

(58) Field of Classification Search
  CPC .................................................. G06F 9/451
  See application file for complete search history.

(56) References Cited

U.S. PATENT DOCUMENTS

| | | | |
|---|---|---|---|
| 8,544,726 B1* | 10/2013 | Hahn | G06F 7/00 |
| 2007/0180360 A1* | 8/2007 | Neil | G06F 17/00 |
| 2014/0298199 A1* | 10/2014 | Johnson, Jr. et al. | H04L 65/403 |
| 2020/0302020 A1* | 9/2020 | Abu Asba et al. | G06F 17/2785 |

* cited by examiner

Primary Examiner — James J Debrow
(74) Attorney, Agent, or Firm — Harrity & Harrity, LLP

(57) ABSTRACT

In some implementations, an event management device may generate a document object model (DOM) associated with a graphical user interface (GUI) that is associated with a platform to cause one or more fields to be included in the GUI. The event management device may provide, to the platform, the DOM to cause the GUI to be displayed. The event management device may receive, via the GUI, an indication of information associated with the event. The event management device may determine that the event satisfies the criteria based on the information received via the GUI. The event management device may store the information associated with the event in a database in connection with an identifier indicating that the event satisfies the criteria. The event management device may transmit an indication of the one or more metrics for display via a client device.

20 Claims, 9 Drawing Sheets

REAL-TIME EVENT STATUS VIA AN ENHANCED GRAPHICAL USER INTERFACE

BACKGROUND

A graphical user interface is a form of user interface that allows users to interact with electronic devices. A graphical user interface may present one or more pages. A user may navigate, via a device, to a page by entering an address into an address bar of the graphical user interface and/or by clicking a link displayed via a page. Navigation to a page may consume resources of the device on which the graphical user interface is displayed, may consume resources of a server that serves the page and/or the graphical user interface, and may consume network resources used for communications between the device and the web server.

SUMMARY

Some implementations described herein relate to a system for automatically providing and analyzing status information for events in real-time. The system may include one or more memories and one or more processors communicatively coupled to the one or more memories. The one or more processors may be configured to store, in a database, information associated with the status information for respective events in a first format. The one or more processors may be configured to provide a graphical user interface (GUI) associated with generating a record associated with an event via a platform, wherein the GUI includes one or more fields associated with inputting information associated with the event that indicate whether the event satisfies criteria for a program in real-time when the record is generated, and wherein the information is input to the GUI via a second format associated with the platform. The one or more processors may be configured to receive, via the GUI, an indication of the information associated with the event in the second format, wherein the information associated with the event indicates whether the event satisfies the criteria. The one or more processors may be configured to analyze, using a machine learning model, the information associated with the event that is input via the GUI to obtain status information associated with the event, wherein obtaining the status information includes converting the information to the first format. The one or more processors may be configured to store the status information associated with the event in the database and in the first format. The one or more processors may be configured to automatically generate, based on storing the status information in the database, an information package associated with the event based on the information associated with the event, wherein the information package includes an amount calculated based on the status information and supporting information associated with the event. The one or more processors may be configured to provide, in a read-only format, the information package.

Some implementations described herein relate to a method for automatically obtaining and providing status information for events in real-time. The method may include generating, by a device, a document object model (DOM) associated with a GUI that is associated with a platform to cause one or more fields to be included in the GUI, the one or more fields being associated with inputting information associated with an event that indicates whether the event satisfies criteria for a program, wherein the GUI is associated with creating a record associated with the event. The method may include providing, by the device and to the platform, the DOM to cause the GUI to be displayed. The method may include receiving, by the device and via the GUI, an indication of information associated with the event, wherein the information associated with the event indicates that the event has been created and whether the event satisfies the criteria. The method may include determining, by the device, that the event satisfies the criteria based on the information received via the GUI. The method may include storing, by the device, the information associated with the event in a database in connection with an identifier indicating that the event satisfies the criteria. The method may include tracking, based on storing the status information in the database in connection with the identifier indicating that the event satisfies the criteria, one or more metrics associated with the event and the program, wherein the one or more metrics include contribution amounts to the event by one or more users associated with the event. The method may include transmitting, by the device, an indication of the one or more metrics for display via a client device.

Some implementations described herein relate to a non-transitory computer-readable medium that stores a set of instructions for a device. The set of instructions, when executed by one or more processors of the device, may cause the device to provide a GUI for display, wherein the GUI includes a page associated with generating a record for an event, and wherein the page includes one or more fields associated with inputting information associated with the event that indicates whether the event satisfies criteria for a program. The set of instructions, when executed by one or more processors of the device, may cause the device to receive, via the GUI and the one or more fields, an indication of information associated with the event, wherein the information associated with the event indicates that the record for the event has been created and indicates whether the event satisfies the criteria. The set of instructions, when executed by one or more processors of the device, may cause the device to store an entry in a database that includes the information associated with the event and an identifier indicating that the event satisfies the criteria. The set of instructions, when executed by one or more processors of the device, may cause the device to obtain, based on storing the entry in the database, user information associated with one or more users that are associated with the event, wherein the user information includes at least one of salary information or activity level information. The set of instructions, when executed by one or more processors of the device, may cause the device to calculate, based on storing the entry, a contribution amount associated with the event and the program, wherein calculating the contribution amount is based on the user information. The set of instructions, when executed by one or more processors of the device, may cause the device to transmit an indication of the contribution amount for display.

DETAILED DESCRIPTION

Figure 1A:
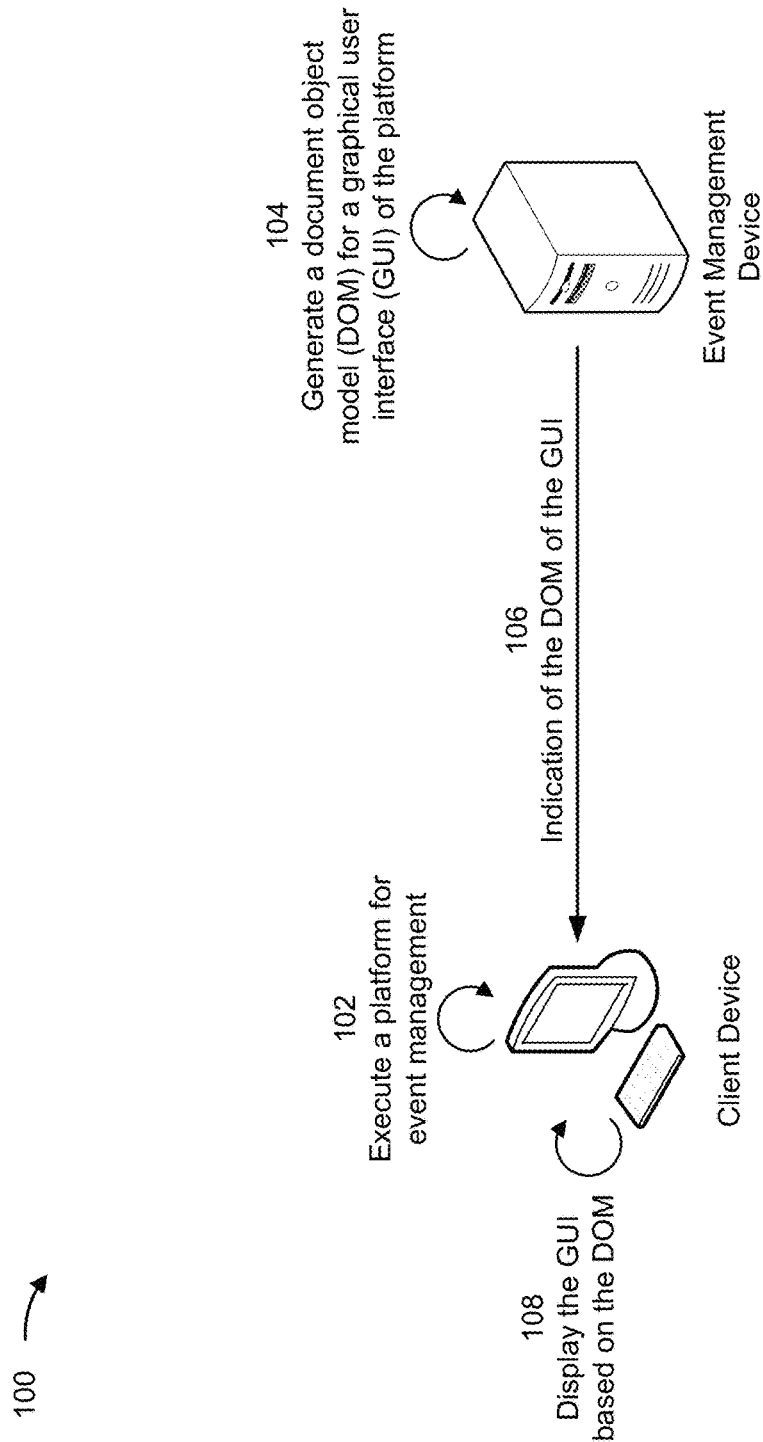
FIGS. 1A-1E are diagrams of an example associated with real-time event status via an enhanced graphical user interface, in accordance with some embodiments of the present disclosure.

The following detailed description of example implementations refers to the accompanying drawings. The same reference numbers in different drawings may identify the same or similar elements.

A user interface of a client device, such as a user interface provided by an application executing on the client device, may include one or more pages for presentation via the client device. A user may interact with the user interface (e.g., with a page associated with the user interface) of the client device to find information. For example, some events (e.g., a task and/or an activity) may qualify for a program based on one or more criteria, and a user interface may be used to manage information associated with the events. As used herein, "event" may refer to a task, a job, a team, an activity, and/or a project, among other examples, associated with an entity. For example, an application executing on the client device may enable status information of an event (e.g., a name of the event, a team affiliation associated with the event, and/or a description of the event) to be input and/or tracked via a user interface. However, it may be difficult for the application to identify, access, and/or navigate to information associated with the events via the user interface. For example, the one or more criteria of the program may be complicated and/or may include information stored in different pages. For example, the application, via the user interface, may need to navigate to multiple pages and/or access multiple documents to accurately identify, access, and/or navigate to information associated with each of the one or more criteria. As a result, it may be difficult for the application to determine whether an event satisfies the one or more criteria of the program via the user interface because the information associated with the criteria is stored in different places and/or because the application may not have access to the relevant information via the user interface. For example, the information associated with the one or more criteria of the program may be stored in a location that the system is not authorized to access.

Navigating through a large number of pages to find relevant information creates a poor user experience, consumes excessive computing resources (e.g., processing resources and memory resources) that are needed for a device to generate and display the pages and that are needed for one or more server devices to serve the pages to the device, and consumes excessive network resources that are needed for communications between the device and the one or more server devices. Further, navigating through a large number of pages may result in a large number of communications between the client device and another device (e.g., a server device) associated with the application, thereby consuming computing resources (e.g., processing resources, memory resources, and/or communication resources), network resources, and/or other resources.

In some cases, multiple different sources storing information associated with a given event may use a different format (e.g., a data structure format) to generate and/or store the information associated with the event. Thus, in some cases, the user interface (e.g., the application executing the user interface) may be unable to accept (e.g., as an input) and/or store information associated with the events that is generated in a format that is not used by the application. As a result, the client device may consume computing resources (e.g., processing resources, memory resources, and/or communication resources), network resources, and/or other resources associated with obtaining, analyzing, and/or storing the information that is in a format that is different than the format used by the application.

Some implementations described herein provide a system for automatically providing and analyzing status information for events in real-time via an enhanced graphical user interface (GUI). In some implementations, the status for an event may be based on whether the event satisfies criteria of a program and/or information associated with the event. In some implementations, the system may store (e.g., in one or more databases) information associated with status information for an event in a first format. In some implementations, status information for an event may include information associated with the event, such as, for example, a name, a team affiliation, a summary, an indication of whether the event qualifies for a program, and/or a pay rate. In some implementations, the first format may be a format (e.g., a data structure format) that is used by the system to store the status information for the event.

In some implementations, the system may use a platform (e.g., an application executing on a client device) to provide a GUI that may receive information associated with the event in a second format. In some implementations, the second format may be a format (e.g., a data structure format) that may be accepted as an input to the system. For example, a client device may present for display the GUI of the platform to a user associated with an entity. In some implementations, the GUI may be associated with generating a record of an event. The GUI may include one or more input options associated with inputting information associated with the event. For example, the client device may obtain information associated with the event via a user input provided to the GUI.

In some implementations, the information associated with the event may indicate whether the event satisfies criteria for a program (e.g., a program associated with an entity). Thus, in some implementations, the system may determine whether the event satisfies criteria of a program in real-time (e.g., shortly after a time when the record associated with the event is generated). In some implementations, to determine whether the event satisfies criteria of the program, the system may use a machine learning model to analyze the information associated with the event that is input via the GUI to obtain status information associated with the event. For example, a machine learning model may be trained using historical events that are associated with a designation indicating whether the historical events qualify for the program. The system may analyze, via the trained machine learning model, information that is input via the GUI to determine whether the event satisfies the criteria for the program. The system may also analyze, via the trained machine learning model, information associated with the event, that is not directly input via the GUI, to determine whether the event satisfies the criteria for the program. For example, the event management device may be in communication with an entity database, such as a technology team tracking database, a human resources database, a contractor expenditure database, and/or a general ledger database, among other examples. The event management device may provide information from one or more of the entity databases, such as contractor information, employee information, job titles, and/or job levels, among other examples, to determine whether the event satisfies criteria for the program.

In some implementations, obtaining the status information may include converting the information input via the GUI from the second format to the first format. In this way, the system is capable of accepting (e.g., as an input) information associated with the events that is generated in the second format (e.g., any format) and converting the second format to the first format of the status information stored in the database.

In some implementations, the system may store (e.g., in one or more databases) the status information associated with the event in the first format. In some implementations, the system may automatically generate an information package associated with the event based on the information associated with the event. The information package may include an amount calculated based on the status information and/or supporting information associated with the event, among other examples. In some implementations, the event management device may provide the information package in a read-only format such that contents of the information package are not modifiable after the information package is generated (e.g., the information package may be accessed but not modified, thereby improving a security of the content of the information package). In some implementations, the event management device may provide the information package to a device (e.g., a server device associated with the entity) that provides the information for display in a web-based secure format such that the contents of the information package may be accessed but not modified. The contents of the information package can be accessed, but not modified, by a person, such as a representative from a government agency that manages or provides the program, via the virtual reading room. For example, the event management device may provide the information package to the server device, and the server device may host a virtual reading room (sometimes called a virtual data room). In some implementations, the virtual reading room may be a virtual environment in which access to information (e.g., documents, videos, and/or images) is restricted. For example, the virtual reading room may be an online repository of information that is used for storing and distributing the information in a secure manner. As an example, the virtual reading room may be an extranet, provided by an entity, to which individuals are given access via a network. The extranet may be controlled by the entity and the individuals can access the extranet via a secure log-on provided by the entity. The entity may protect data, such as data associated with the information package and/or the supporting documentation, by restricting the individuals from modifying, forwarding, and/or copying the data, among other examples, that the entity causes to be displayed via the virtual reading room. In other words, for example, the virtual reading room may provide access to secure documents and/or files for authorized users through a dedicated website and/or through secure applications.

Accordingly, the user interface of the system may enable status information of an event to be input and/or tracked via, the system, in real-time without requiring the system to navigate to multiple pages via the user interface (e.g., the status information is stored in a database rather than multiple different pages). In this way, the user interface of the system may improve access to data, and may improve the accuracy of the data because the information is input and analyzed in real-time. Additionally, the information will be more accurate because the information associated with the event is accepted as an input by the user interface at an initial time associated with the event (e.g., because the information that is input may be fresh in a user's mind). Further, the use of the user interface (e.g., via the client device) described herein may conserve computing resources (e.g., processing resources, memory resources, and/or communication resources), networking resources, and/or other resources that would have otherwise been associated with identifying, accessing, and/or navigating to information that indicates whether the event (e.g., for which a record is generated using the user interface) satisfies the criteria of the program.

In other words, a user may quickly locate informational content of interest associated with the event and input information indicating whether the event qualifies for the program without navigating away from a page associated with generating a record of the event and without following numerous links from a page of the user interface. In this way, computing resources and/or network resources may be conserved by reducing an amount of navigation performed by the user. Furthermore, the system described herein makes data easier to access by enhancing a user interface, thereby improving a user experience, and/or enhancing user-friendliness of a client device and the user interface, among other examples.

FIGS. 1A-1E are diagrams of an example 100 associated with real-time event status via an enhanced graphical user interface. As shown in FIGS. 1A-1E, example 100 includes an event management device, a client device, and/or one or more databases (e.g., one or more event databases and/or one or more user databases). These devices are described in more detail in connection with FIGS. 3 and 4.

As shown in FIG. 1A, and by reference number 102, a client device may execute a platform (e.g., a platform for event management). In some implementations, the platform (also called an event management platform) may be a computer program (e.g., an application) that is executable on the client device. In some implementations, the platform may be in communication with an event management device via the client device. In some implementations, the platform may include a GUI that may receive a user input from a user of the client device. In some implementations, the platform may manage information associated with an event (e.g., one or more tasks, one or more jobs, and/or one or more activities associated with an entity) and/or information associated with a program (e.g., a program associated with an entity) in real-time.

In some implementations, the platform may be used to manage a workflow associated with an event based on the program. For example, an event may be associated with a program, and the platform may generate a record associated with the event (e.g., before the event begins, when the event is assigned, and/or after the event begins). For example, a team associated with an entity may be assigned to a project, and the platform may accept an input (e.g., information associated with the project) to generate a record associated with the project. In some implementations, a record may include information associated with an event, such as an event name, pay rate of each team member of a team, team members assigned to the event, a summary of the event, and/or other event information. The record may be used by an entity to track and/or store the event information. In some implementations, the platform may track information associated with the record as the event progresses. For example, if the project qualifies for the program (e.g., satisfies criteria of the program), then the platform may track an amount of time that each team member has worked on the project until the project is completed. In some implementations, the platform may analyze the information to perform calculations. For example, the platform may determine an amount based on each team member's pay rate and time contribution to the project.

For example, the program may be a tax credit program that may enable an entity to claim a tax credit based on whether the event satisfies criteria of the tax credit program. For example, the tax credit program may enable an entity to claim a research credit (e.g., a research and development (R&D) tax credit offered by a governmental agency, such as the Internal Revenue Service (IRS) in the United States) based on expenses paid or incurred for qualified research. Qualified research may include research where expenses are incurred in connection with the entity's trade or business and where expenses represent a research and development cost in the experimental or laboratory sense. Expenditures may represent research and development costs in the experimental or laboratory sense if the expenditures are for activities intended to discover information that would eliminate uncertainty concerning the development or improvement to a product. Uncertainty may exist if the information available to the entity does not establish the capability or method for developing or improving the product or the appropriate design of the product.

Thus, in some implementations, an event may be based on one or more activities that satisfy criteria of the tax credit program (e.g., one or more activities that qualify as qualified research). For example, an event may be based on one or more activities intended to discover information that would eliminate uncertainty concerning the development or improvement to a product.

In some implementations, if an event satisfies the criteria of the tax credit program, a tax credit amount may be calculated based on information associated with the event. For example, the tax credit amount may be based on amounts paid or incurred to energy consortia, research payments to qualified organizations, qualified organization base period amounts, wages for qualified services, costs of supplies, rental or lease costs of computers, contract research expenses, and/or annual gross receipts, among other examples.

As shown in FIG. 1A, and by reference number 104, the event management device may generate a document object model (DOM) for a graphical user interface (GUI) of the platform. For example, the event management device may generate a DOM for a GUI in response to the client device requesting a resource associated with the platform (e.g., a GUI associated with the platform) from the event management device. For example, if the platform is opened via the client device (e.g., is executed on the client device), then the client device may request the GUI from the event management device. In some implementations, the GUI may be a document object (e.g., a page associated with an entity) that may be associated with generating a record for an event. In some implementations, the record for the event may include information that may indicate whether the event satisfies criteria for a program. For example, the GUI may include a page (e.g., a page of a platform associated with an entity or a page associated with an application executing on the client device) that may include an input option (e.g., one or more selectable fields and/or one or more fillable fields) associated with inputting information associated with the event that may indicate whether the event satisfies criteria for a program. For example, the event management device may modify the DOM associated with the GUI to cause the input option to be included in the GUI, as described in more detail below in connection with FIG. 1B and elsewhere herein. In some implementations, the GUI may accept an input (e.g., information from a user of the client device) in the second format that can be understood by the event management device and then later converted to the first format to be stored (e.g., in a database), as described in more detail elsewhere herein.

As shown in FIG. 1A, and by reference number 106, the event management device may transmit, and the client device may receive, an indication of the DOM of the GUI. For example, the event management device may transmit the indication of the DOM of the GUI in response to the client device requesting a resource (e.g., the GUI of the platform) from the event management device. For example, if a user signs into the platform (e.g., if the client device receives authenticated user credentials for an account registered with the platform), then the client device may request the GUI from the event management device.

As shown in FIG. 1A, and by reference number 108, the client device may display the GUI based on the DOM. For example, the client device may display the GUI based on receiving the indication of the DOM of the GUI from the event management device. In some implementations, the indication of the DOM of the GUI may include code for generating the GUI, and the client device may execute the code to display the GUI (e.g., in a web browser of the client device). In some implementations, the client device may present the GUI to a user of the client device.

Figure 1B:
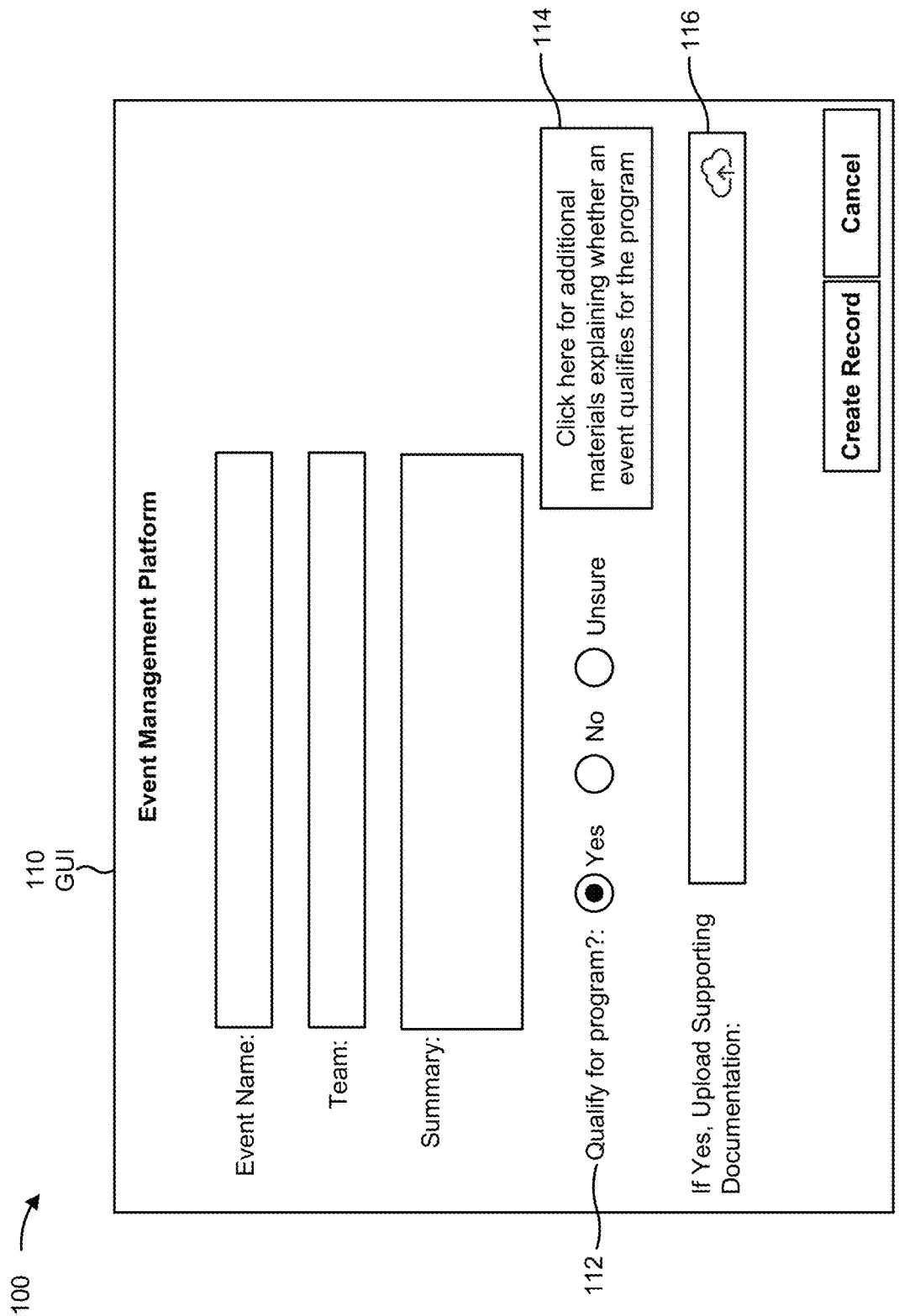

As shown in FIG. 1B, and by reference number 110, the GUI may be a page provided in the event management platform executing on the client device. As shown, the GUI may include multiple input options associated with an event and/or a program. The multiple input options may enable a user, via the client device, to input information associated with an event into the GUI and/or perform other operations (e.g., click a link and/or upload documents), as described in more detail elsewhere herein. For example, the GUI may be associated with generating a record for an event associated with an entity.

As shown in FIG. 1B, and by reference number 112, the GUI may an include an input option that may enable a user to select "Yes," "No," or "Unsure," in response to whether an event qualifies for the program. In some implementations, a user may select "Yes" if the user is associated with the event that satisfies criteria of the program, "No," if the user is associated with an event that does not satisfy criteria of the program, or "Unsure" if the user is associated with the event and the user is unsure if the event satisfies the criteria of a program. For example, the program may be a tax credit program (described above), and a user may select "Yes" if the user is associated with an event that qualifies as qualified research, "No," if the user is associated with an event that does not qualify as qualified research, or "Unsure" if the user is associated with an event and the user is unsure if the event qualifies as qualified research.

As shown in FIG. 1B, and by reference number 114, the GUI may include an input option that may enable a user to select a link that may navigate the user to a page or a website that may include additional materials associated with the program. For example, if the program is a tax credit program (described above), the user may select a link to a web page that may include additional materials associated with the tax credit program. For example, the additional materials may include text, images, and/or videos that may include details associated with a process of claiming a research credit based on expenses paid or incurred for qualified research, a definition of qualified research, examples of qualified research, a definition associated with research and development costs in the experimental or laboratory sense, examples of expenditures for activities intended to discover information that would eliminate uncertainty concerning the development or improvement of a product, and/or information related to qualified expenses. Additionally, or alternatively, the GUI may automatically provide additional materials associated with the program. For example, if the GUI detects user activity (e.g., keystrokes and/or mouse movements), the GUI may automatically provide the additional materials (e.g., in a pop-up screen). In some implementations, the GUI may automatically provide the additional materials for display based on detecting that the user has selected the "unsure" input option described above.

As shown in FIG. 1B, and by reference number 116, the GUI may an include an input option that may enable a user to upload supporting documentation if the user selects "Yes" in response to whether the event qualifies for the program. For example, if the user selects "Yes" in response to whether the event qualifies for the program, the user may upload supporting documentation associated with the event. For example, the supporting documentation may include details based on the criteria of the program, documents associated with the event, a video of the user explaining why the event qualifies for the program, and/or images, among other examples. For example, if the program is a tax credit program, then the supporting documentation may include information based on the event qualifying as qualified research and/or expenditure details. In some implementations, the GUI may provide a recording option (e.g., a "Record Audio and/or Video" button) where a user may click a button that automatically enables the user to create a recording (e.g., an audio and/or a video recording) that may be provided by the client device to the event management device, as described in more detail elsewhere herein. For example, a user may click the record button to create a video explaining why the event qualifies for the program and the client device may transmit the video recording to the event management device. This may improve access to supporting documentation indicating why an event qualifies for the program because the user is enabled to provide the supporting documentation in real-time (e.g., when the record associated with the event is created) and at a single source (e.g., via the GUI).

In some implementations, the GUI may an include an input option that may enable a user to upload supporting documentation after the event management device has determined that the event qualifies for the program. For example, a user associated with an entity may, after initial qualification of the event, provide additional details associated with the event as the event progresses, such as an event qualification form, and/or an event diagram, among other examples. For example, the GUI may provide a field and/or a page that enables the user to upload a document, video, and/or image indicating additional details associated with the event as the event progresses.

Figure 1C:
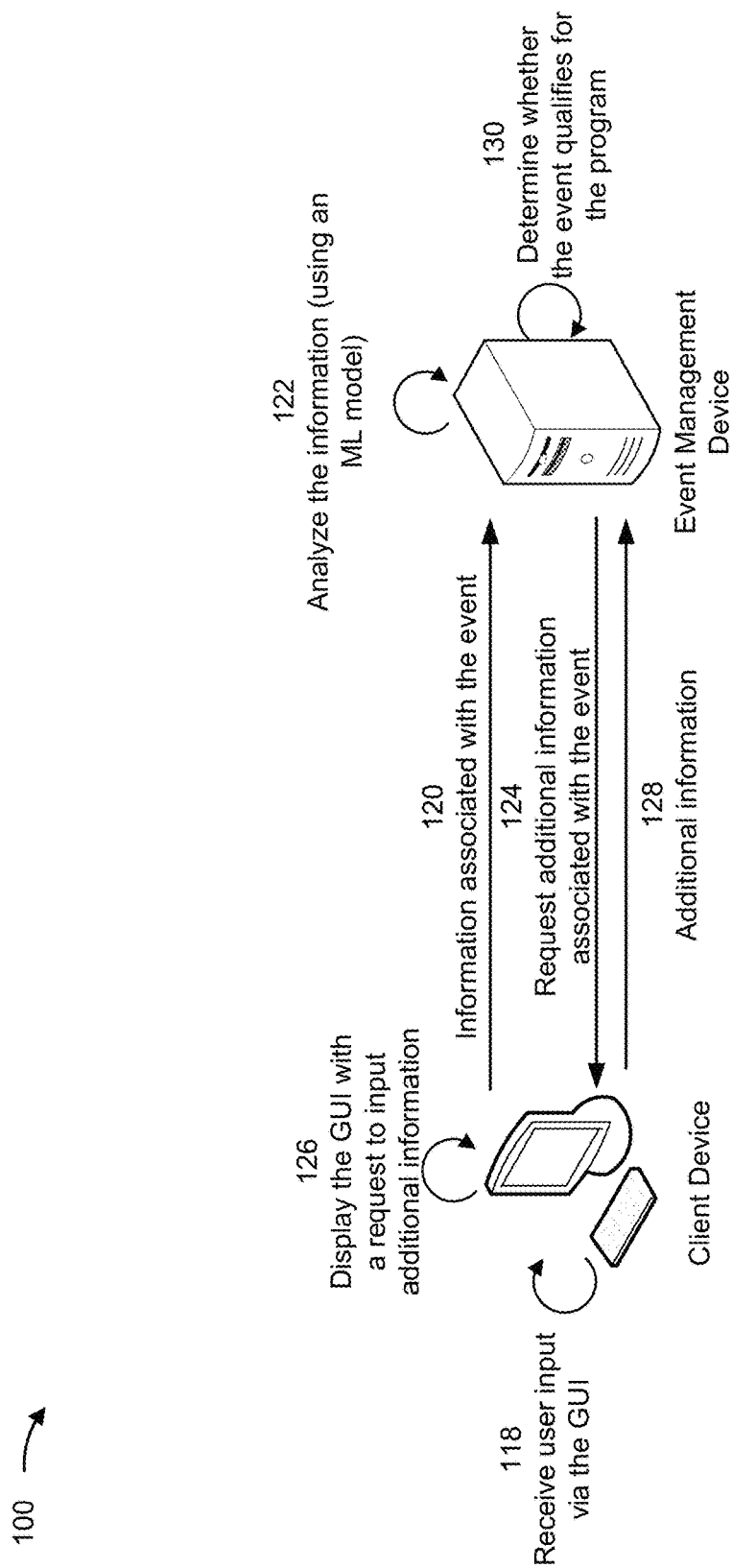

As shown in FIG. 1C, and by reference number 118, the client device may obtain a user input via the GUI. For example, the GUI may obtain, from a user of the client device, a user input based on one or more of the multiple input options of the GUI (e.g., the multiple input options described in connection with FIG. 1B and/or reference numbers 110, 112, 114, and/or 116). For example, a team associated with an entity may be tasked with performing a qualifying activity (e.g., an event) that qualifies for a tax credit program associated with the entity. For example, the client device may present for display the GUI of the platform to a user associated with the team and/or the entity. For example, the client device may obtain a user input, via the GUI, associated with the qualifying activity. For example, the user input may be a qualifying activity name entered in an "Event Name" field, names of individuals associated with the qualifying activity entered in a "Team" field, a written description of the qualifying activity entered in a "Summary" field, and/or a selection of a "Yes" input option that indicates that the qualifying activity qualifies for the tax credit program, among other examples.

For example, the GUI may obtain, from a user of the client device, supporting documentation associated with the qualifying activity based on the user input that is a selection of the "Yes" input option. For example, the GUI may obtain supporting documentation including a written description that indicates why the qualifying activity satisfies each criterion of the one or more criteria of the tax credit program and/or a video of the user explaining why the qualifying activity qualifies for the program.

As shown in FIG. 1C, and by reference number 120, the event management device may obtain, from the client device, information associated with the event. For example, the client device may provide, and the event management device may obtain, an indication of the information associated with the event that is input via the GUI in response to receiving an indication to create a record associated with the event. For example, a user may click a "Create Record" button of the GUI (see FIG. 1B) that may provide an indication to create a record associated with the event to the GUI. For example, based on receiving an indication to create a record associated with the event, the GUI may cause the client device to transmit the information associated with the event that is input via the GUI to the event management device.

As shown in FIG. 1C, and by reference number 122, the event management device may analyze information associated with the event. For example, based on obtaining the indication of the information associated with the event from the client device, the event management device may use a machine learning model to analyze the information associated with the event, that is input via the GUI, to obtain status information associated with the event. In some implementations, the event management device may use the machine learning model to convert the information from the second format to the first format. As another example, the event management device may use the machine learning model to analyze the information associated with the event, that is not directly input via the GUI, to obtain status information associated with the event. For example, the event management device may be in communication with an entity database, such as a technology team tracking database, a human resources database, a contractor expenditure database, and/or a general ledger database, among other examples. The event management device may provide information from one or more of the entity databases, such as contractor information, employee information, job titles, and/or job levels, among other examples, to obtain the status information associated with the event.

In some implementations, the machine learning model may be trained using historical events that may be associated with a designation indicating whether the historical events qualify for the program. For example, the machine learning model may be trained using features, such as an indication input, a team name, and/or a number of keywords associated with a description of an event, as described in more detail below. For example, the event management device may use a qualifying identifier to identify an event that qualifies for a program. In some implementations, the qualifying identifier may indicate for which program the event qualifies and why the event qualified for the program. For example, if the historical event is a job that qualifies for a tax credit program associated with an entity, the event management system may assign a qualifying indicator that indicates that the job qualifies for the tax credit program and that the job satisfies each criterion of the one or more criteria associated with a tax credit program. In some implementations, the event management device may store the event and the qualifying indicator in a database.

In some implementations, the event management device may provide information associated with the event, that is input via the GUI, as an input to a machine learning model. For example, the information that is input to the GUI may include a user input indicating whether the event qualifies for the program, a description of the event, a name of the event, a team affiliation associated with the event, and/or one or more survey responses obtained via the GUI. In some implementations, the event management device may obtain, via an output of the machine learning model, a confidence score indicating a likelihood that the event satisfies the criteria. Training and use of the machine learning model is described in more detail in connection with FIG. 2.

As shown in FIG. 1C, and by reference number 124, the event management device may request additional information associated with the event. In some implementations, the event management device may request additional information based on a confidence score associated with an event. For example, the event management device may automatically request additional information in real-time based on a user input that indicates that an event qualifies for a program and a confidence score associated with the event that is below a threshold. For example, a user associated with an entity may be tasked with a research project that the user believes qualifies for a tax credit program associated with an entity. The GUI may obtain a user input that indicates that the research project qualifies for the tax credit program (based on the user's belief that the research project qualifies for the tax credit program). However, a confidence score (e.g., determined by the event management device) indicating the likelihood that the research project satisfies criteria of the tax credit program may trigger the event management device to request additional information from the user. This may improve a determination, in real-time, of whether the event satisfies the criteria for the program, thereby conserving processing resources, computing resources, memory resources, and/or network resources, among other examples, that would have otherwise been used to identify that the event may not qualify for the program, investigate whether the event qualifies for the program, locate supporting documentation, and/or store information (e.g., in the database, as described in more detail elsewhere herein) associated with an event that does not actually qualify for the program, among other examples, at a later date when information may be more difficult to locate.

For example, based on a determination that the confidence score associated with the information satisfies the threshold, the event management device may modify the DOM associated with the GUI to cause a field and/or a page associated with an input request (and/or associated with input requests) for additional information associated with the event to be included in the GUI. The event management device may provide the DOM to the client device to cause the field and/or the page to be displayed via the GUI, as described elsewhere herein.

As another example, the event management device may automatically request additional information in real-time based on a confidence score associated with the event that does not satisfy a first threshold but does satisfy a second threshold. For example, the first threshold may indicate a higher likelihood that an event satisfies criteria of a program than the second threshold.

For example, based on a determination that the confidence score associated with the information does not satisfy the first threshold and does satisfy the second threshold, the event management device may modify the DOM associated with the GUI to cause a field and/or a page associated with an input request for additional information associated with the event to be included in the GUI. The event management device may provide the DOM to the platform to cause the field and/or the page to be displayed via the GUI as described elsewhere herein. This may conserve processing resources, computing resources, memory resources, and/or network resources, among other examples, that would have otherwise been used to request additional information for events having a confidence score that does not satisfy the second threshold because a confidence score that does not satisfy the second threshold may indicate a low likelihood that the event qualifies for the program.

As shown in FIG. 1C, and by reference number 126, the client device may provide the GUI for display with a request to input additional information. In some implementations, the event management device may transmit, and the client device may obtain, an indication of a request for additional information associated with the event. For example, the event management device may transmit, and the client device may obtain, an indication of the DOM of the GUI (e.g., the updated DOM of the updated GUI) based on the request for additional information. In some implementations, the client device may present the GUI for display to a user of the client device.

As shown in FIG. 1C, and by reference number 128, the event management device may obtain additional information associated with the event. In some implementations, a user input that may include additional information may be obtained via the GUI. For example, the GUI may obtain, from a user of the client device, a user input based on the request to input additional information. For example, based on obtaining user input based on the request for additional information, the GUI may cause the client device to transmit the additional information associated with the event that is input via the GUI to the event management device.

As shown by reference number 130, the client device may determine whether the event qualifies for the program. For example, if the event management device obtains, via an output of the machine learning model, a confidence score that satisfies a threshold, then the event management device may determine that the event satisfies the criteria of the program based on the confidence score satisfying the threshold. Thus, in some implementations, the event management device may determine whether to request additional information and/or determine that an event satisfies criteria of a program based on a comparison between one or more thresholds and a confidence score indicating a likelihood that an event satisfies criteria of a program. In some implementations, the event management device may determine that the event qualifies for the program based on a user input that indicates that the event qualifies for the program. For example, the GUI may obtain a user input that is a selection of "Yes" in response to whether the event qualifies for the program, and the event management device may determine that the event qualifies for the program based on the user input.

Figure 1D:
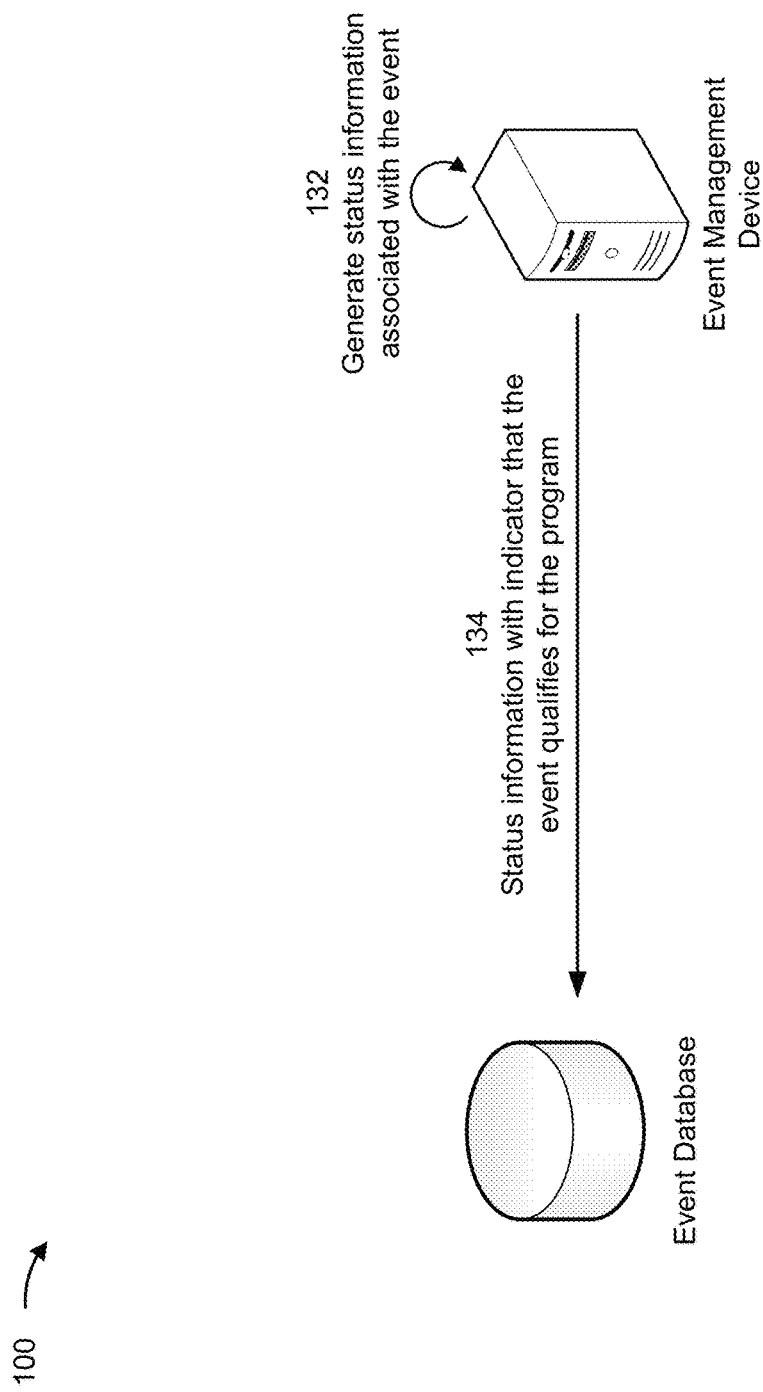

As shown in FIG. 1D, and by reference number 132, the event management device may generate status information associated with the event. In some implementations, the event management device may generate status information associated with the event based on determining whether the event qualifies for the program (e.g., based on whether the event satisfies the criteria of the program). For example, the event management system may determine whether the event satisfies the criteria of the program by using the machine learning model, as described in more detail elsewhere herein, and/or based on information input via the GUI.

In some implementations, the status information may include an indicator that indicates whether the event qualifies for the program. For example, based on a determination that the event qualifies for the program, the event management device may generate status information that may include an indicator that indicates that the event qualifies for the program. As another example, based on a determination that the event does not qualify for the program, the event management device may generate status information that may include an indicator that indicates that the event does not qualify for the program. In some examples, if the event management device determines that the event does not qualify for the program, then the event management device may refrain from storing status information associated with the event, thereby conserving memory resources.

As shown in FIG. 1D, and by reference number 134, the event management device may provide, and an event database may obtain, the status information including the indicator that indicates whether the event qualifies for the program. For example, the event management device may transmit, and the event database may obtain, the status information including the indicator that indicates whether the event qualifies for the program based on generating the status information. Thus, in some implementations, the event management system may store information associated with the event in a database in connection with an identifier indicating that the event satisfies the criteria. For example, the event database may store status information for respective events that may indicate whether the respective events qualify for respective programs. In this way, for example, the event management device may track the events that qualify and may calculate credit amounts in real-time based on the status information stored in the event database. Further, for example, because status information is stored in the event database in a standardized format, the event management device may quickly identify the relevant information to enable the credit amounts to be quickly calculated (e.g., updated in real-time).

Figure 1E:
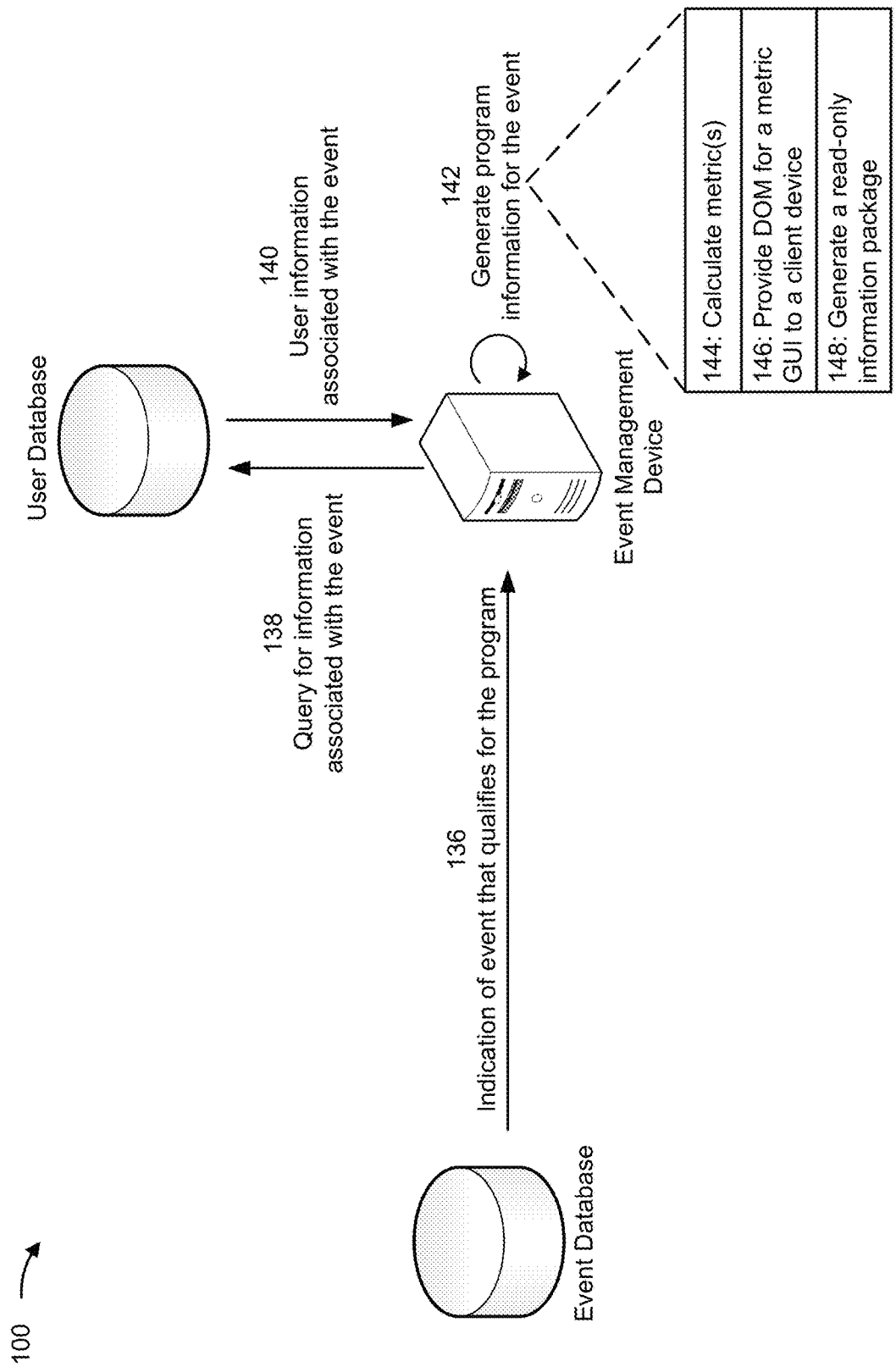

As shown in FIG. 1E, and by reference number 136, the event management device may obtain or detect an indication of an event that qualifies for the program via information stored in the event database. In some implementations, the event database may provide an indication of an event that qualifies for the program in response to a request by the event management device for information associated with events that qualify for the program (e.g., the event management device may query or search the database for events that qualify for the program). In some implementations, the GUI may include a search option that may enable the GUI to receive a search request (e.g., from a user of the client device). For example, the event management device may configure the DOM associated with the GUI to cause a field and/or a page associated with a search option to be included in the GUI. For example, the GUI may obtain, from a user of the client device, a user input based on the search option. For example, a user may submit a query (e.g., a search based on keywords) associated with an event that qualifies for a program into the search option of the GUI. For example, based on obtaining the query associated with the event, the GUI may cause the client device to transmit the query to an event database.

For example, a user (e.g., a tax professional associated with an entity) may submit a query into the search option of the GUI based on an event that is a project associated with an entity that qualifies for a tax credit program. For example, the query may include identifying information associated with the project that qualifies for the tax credit program, such as a name of the project, a name of a team member associated with the project, and/or keywords that may be included in a summary of the project, among other examples. For example, based on obtaining the query associated with the project, the GUI may cause the client device to transmit the query to the event database. For example, based on obtaining the query associated with the event, the event database may perform a search based on the query to determine whether the event database is storing the project associated with the query. For example, the event database may identify the project based on the name of the project provided in the query. In some implementations, the event database may transmit, and the event management device may obtain, an indication of the project that qualifies for the program associated with the query based on the event database identifying the project associated with the query.

As shown in FIG. 1E, and by reference number 138, the event management device may query a user database (also called an employee database) for user information. In some implementations, the event management device may query (e.g., automatically query) the user database for user information based on obtaining the indication of the event that qualifies for a program associated with the query from the event database. In some implementations, the user information may include a pay rate and/or a salary for each member of the team affiliation, and/or a time contribution associated with the event for each member of the team affiliation (e.g., an amount of time that each member of the team affiliation has worked on the event), among other examples. For example, the user database may be a human resources database that may store information associated with users (e.g., employees), and the event management device may query the human resources database for user information based on identifiers associated with the event (e.g., a name of the event, team names, and/or a description of the event, among other examples). In some implementations, the event management device may query the user database using an identifier associated with the event to obtain information associated with a set of users that are associated with the event.

As shown in FIG. 1E, and by reference number 140, the user database may transmit, and the event management device may obtain, user information associated with the event. For example, the user database may transmit, and the event management device may receive, an indication of user information associated with the event based on the query for information associated with the event that qualifies for the program. In some implementations, the user database may transmit, and the event management device may obtain, an indication of the user information associated with the event based on the user database identifying the user information associated with the event.

As shown in FIG. 1E, and by reference number 142, the event management device may generate program information for an event. In some implementations, program information may include one or more metrics (e.g., users associated with an event, rate information of the users associated with the event, activity information of the users associated with the event, contribution amounts to an event by users associated with the event, and/or a credit amount associated with the event). In some implementations, the event management device may generate the program information for an event in response to the GUI obtaining a user input that indicates a request to generate an information package. In some implementations, the GUI may include an information package generation option that may enable the GUI to receive a request to generate the information package (e.g., from a user of the client device). For example, the event management device may configure the DOM associated with the GUI to cause a field and/or a page associated with an information package generation option to be included in the GUI. For example, the GUI may obtain, from a user of the client device, a user input based on the information package generation option of the GUI. For example, a user may input a selection that indicates a request to generate an information package into the information package generation option of the GUI. For example, based on obtaining the request to generate the information package, the GUI may cause the event management device to generate the information package. In some implementations, the information package may include information associated with the event that qualifies for the program as described in more detail elsewhere herein.

As shown by reference number 144, the event management device may calculate metrics associated with the event. In some implementations, the information package may include an amount calculated based on the status information and/or supporting information associated with the event. For example, the event management device may cause records, from the user database (e.g., employee database), associated with the one or more users (e.g., employees) that are associated with the event to be provided to the event management device based on determining that the event satisfies the criteria. In some implementations, the records may indicate pay information and activity information associated with respective users from the one or more users. In some implementations, the event management device may calculate a credit amount based on the rate information (e.g., pay information) and/or the activity information associated with the respective users associated with the event that qualifies for the program. For example, the event management device may calculate a credit amount based on an amount of time that a user spent on an event (e.g., determined based on the activity information associated with the user and the rate information associated with the user). In some implementations, the event management device may store (e.g., in the event database) an indication of the credit amount.

In some implementations, the event management device may track, based on storing the status information in the event database in connection with the identifier indicating that the event satisfies the criteria, the one or more metrics associated with the event and the program. For example, the one or more metrics may include contribution amounts (e.g., an amount of a user's salary) to the event by one or more users associated with the event. In some implementations, the event management device may determine the one or more users associated with the event based on roles (e.g., employee job titles, such as a human resource role and/or an engineer role) associated with respective users, from a set of users, that are qualified for the program. For example, the event management device may determine that a user with an engineer role may be included in the one or more users and a user with a human resource role may not be included in the one or more users.

In some implementations, the event management device may transmit, and the client device may obtain, an indication of the one or more metrics for display via a client device. For example, the one or more metrics may include a total credit amount for a given event and/or for all events for an entity that qualify for a program.

For example, to track the one or more metrics, the event management device may periodically obtain, from the event database, an indication of events, including the event, that satisfy the criteria. In some implementations, the event management device may aggregate contribution amounts associated with the events based on rate information and activity levels of users associated with the events. In some implementations, the event management device may determine a total contribution amount associated with the events based on aggregating the contribution amounts. In some implementations, the event management device may provide the total contribution amount associated with the events based on aggregating the contribution amounts for display via the client device (e.g., via a dashboard associated with the platform). Thus, in some implementations, the event management device may track information associated with the event over a lifespan of the event (e.g., from a time when the event starts to a time when the event is finished) and may provide the information associated with the event for display via the client device.

In some implementations, to track the one or more metrics, the event management device may obtain, based on the information associated with the event that is input via the GUI, an indication of the one or more users associated with the event. In some implementations, the event management device may obtain rate information (e.g., salaries of the respective users) and/or activity information (e.g., amounts of time that the respective users contributed to the event) associated with respective users from the one or more users based on the indication of the one or more users associated with the event.

In some implementations, the event management device may update the records in real-time. Thus, in some implementations, the event management device may calculate the credit amount based on receiving an update to the records indicating a change in rate information (e.g., pay information) and/or activity information associated with a user of the one or more users. This may enable a user to identify issues in real-time and conserve computing resources that would have otherwise been used to identify, search for, and/or correct issues at a subsequent time.

As shown in FIG. 1E, and by reference number 146, the event management device may provide a DOM for a metric GUI to a client device. For example, the event management device may generate a DOM for a metric GUI of the platform. In some implementations, the metric GUI may include information associated with one or more metrics (e.g., users associated with an event, rate information of the users associated with the event, activity information of the users associated with the event, contribution amounts to an event by users associated with the event, and/or a credit amount associated with the event). For example, if a user is associated with a research project that qualifies for a tax credit program associated with an entity, then the one or more metrics may include a name of the user, a salary of the user, a contribution amount to the research project by the user, and/or a tax credit amount (e.g., based on the tax credit program). In some implementations, the event management device may transmit, and the client device may receive, an indication of the DOM of the metric GUI. For example, the event management device may transmit the indication of the DOM of the metric GUI in response to the information package being generated. For example, the event management device may receive an indication when the information package is generated.

As shown in FIG. 1E, and by reference number 148, the event management device may generate a read-only information package. For example, the event management device may generate a read-only information package based on the generated information package. In some implementations, the event management device may transmit, and the client device may obtain, the read-only information package for display via the client device. In some implementations, the read-only format of the information package prevents any modifications to information in the read-only information package. For example, the read-only information package may be provided to a person that is not associated with the entity (e.g., a representative from a government agency that manages or provides the program), and the read-only format of the information package prevents the person that is not associated with the entity from making any modifications to the read-only information package, thereby improving security and authenticity of the information included in the read-only information package. In some implementations, the event management device may provide the information package to a device (e.g., a server device associated with the entity) that provides the information for display in a web-based secure format such that the contents of the information package may be accessed but not modified. The contents of the information package can be accessed, but not modified, by a person, such as a representative from a government agency that manages or provides the program, via the virtual reading room, as described in more detail elsewhere herein.

Accordingly, the user interface of the system may enable status information of an event to be input and/or tracked via a user interface in real-time without requiring the user interface to navigate to multiple pages (e.g., the status information is stored in a database rather than multiple different pages). In this way, the user interface of the system may improve access to data, and may improve the accuracy of the data because the information is input and analyzed in real-time. Additionally, the use of the user interface (e.g., via the client device) described herein may conserve computing resources (e.g., processing resources, memory resources, and/or communication resources), networking resources, and/or other resources that would have otherwise been associated with identifying, accessing, and/or navigating to information that indicates whether the event (e.g., for which a record is generated using the user interface) satisfies the criteria of the program.

As indicated above, FIGS. 1A-1E are provided as an example. Other examples may differ from what is described with regard to FIGS. 1A-1E.

Figure 2:
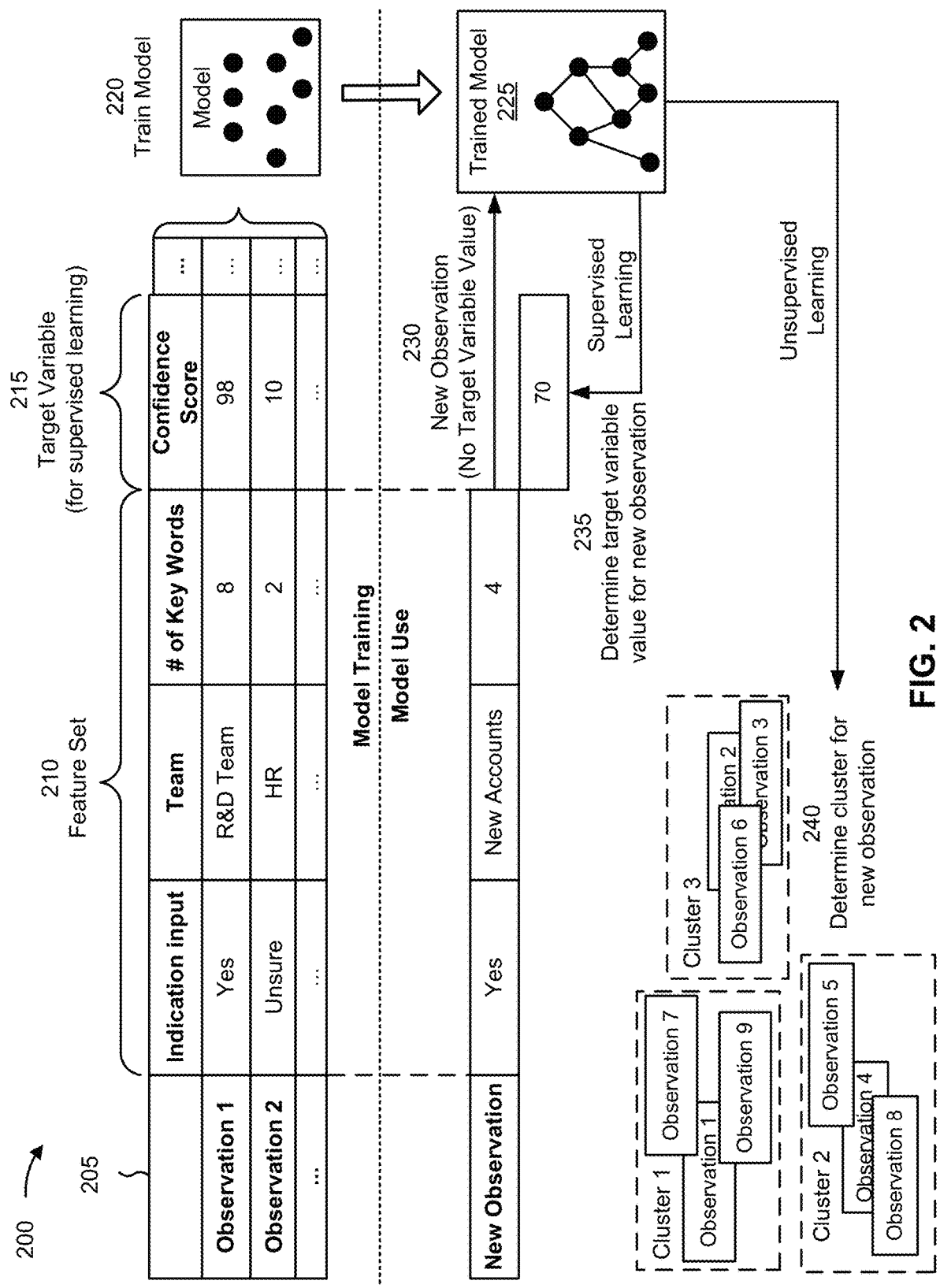
FIG. 2 is a diagram illustrating an example of training and using a machine learning model in connection with real-time event status via an enhanced graphical user interface, in accordance with some embodiments of the present disclosure.

FIG. 2 is a diagram illustrating an example 200 of training and using a machine learning model in connection with real-time event status via an enhanced graphical user interface. The machine learning model training and usage described herein may be performed using a machine learning system. The machine learning system may include or may be included in a computing device, a server, a cloud computing environment, or the like, such as the event management device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the event management device, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the event management device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of "Indication input" (e.g., associated with whether a user checks a box via the GUI, such as the field shown by reference number 112), a second feature of "Team" (e.g., associated with a name of an event), a third feature of "# of Key Words" (e.g., number of identified keywords in a summary of an event), and so on. As shown, for a first observation, the first feature may have a value of "Yes," the second feature may have a value of "R&D Team", the third feature may have a value of "98", and so on. These features and feature values are provided as examples, and may differ in other examples. For example, the feature set may include one or more of the following features: a user input indicating whether the event qualifies for the program, a description of the event, a name of the event, a team affiliation associated with the event, one or more survey responses obtained via the GUI, rate information, activity information, and/or a number of identified keywords (e.g., in a summary of the event and/or in supporting documentation uploaded via a GUI), contractor information, employee information, job titles, and/or job levels, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is "Confidence Score", which has a value of 98 for the first observation. In some implementations, the confidence score may be used to indicate a likelihood that an event satisfies criteria of a program, as describe in more detail elsewhere herein.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. In some implementations, the machine learning model may be trained using historical events that may be associated with a designation indicating whether the historical events qualify for the program. For example, the event management device may use a qualifying identifier to identify an event that qualifies for a program. In some implementations, the qualifying identifier may indicate for which program the event qualifies and why the event qualified for the program. For example, if the historical event is a job that qualifies for a tax credit program associated with an entity, the event management system may assign a qualifying indicator that indicates that the job qualifies for the tax credit program and that the job satisfies each criterion of the one or more criteria associated with a tax credit program. For example, if the historical event is a job that does not qualify for a tax credit program associated with an entity, the event management system may assign a qualifying indicator that indicates that the job does not qualify for the tax credit program and that the job does not satisfy each criterion of the one or more criteria associated with a tax credit program. Thus, in some implementations, the machine learning model may be trained based on historical events that qualify and that do not qualify for a program. After training, the machine learning system may store the machine learning model as a trained machine learning model 225 to be used to analyze new observations.

As an example, the machine learning system may obtain training data for the set of observations based on historical events that have qualified and/or that have not qualified for a program. For example, the historical events that have qualified and/or that have not qualified may be determined based on records (e.g., stored in one or more databases) associated with an entity.

As shown by reference number 230, the machine learning system may apply the trained machine learning model 225 to a new observation, such as by receiving a new observation and inputting the new observation to the trained machine learning model 225. As shown, the new observation may include a first feature of "Yes," a second feature of "New Accounts," a third feature of "4," and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 70 for the target variable of "Confidence Score" for the new observation, as shown by reference number 235. Based on this prediction, the machine learning system may cause a first automated action to be performed (e.g., by instructing another device to perform the automated action), among other examples. The first automated action may include, for example, causing the event management device to automatically request additional information associated with an event.

As another example, if the machine learning system were to predict a value of 98 for the target variable of "Confidence Score," then the machine learning system may cause performance of a second (e.g., different) automated action (e.g., causing the event management device to determine that an event satisfies criteria of a program and/or automatically store status information associated with the event in a standardized format in a database).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., "Definitely Qualifies"), then the machine learning system may cause a first automated action to be performed (e.g., by instructing another device to perform the automated action) based on classifying the new observation in the first cluster, such as causing the event management device to determine that an event satisfies criteria of a program and/or automatically store status information associated with the event in a standardized format in a database.

As another example, if the machine learning system were to classify the new observation in a second cluster (e.g., "Maybe Qualifies"), then the machine learning system may cause performance of a second (e.g., different) automated action, such as causing the event management device to automatically request additional information associated with an event.

In some implementations, the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include indications of whether an event satisfies criteria of a program, as described in more detail elsewhere herein. In some implementations, the feedback information may include an indication of whether the event was approved for the program by an agency (e.g., a government agency) that manages or provides the program. In some implementations, the feedback information may include additional information submitted by the user in response to the machine learning model causing the event management device to automatically request additional information associated with the event. For example, the machine learning model may classify a new observation in the second cluster (e.g., "Maybe Qualifies") causing the event management device to automatically request additional information associated with the event. Additional information may be provided by the user that indicates that the event does or does not qualify for the event. For example, if the additional information indicates that the event qualifies for the program, the machine learning model may classify the observation in the first cluster (e.g., "Definitely Qualifies"). The initial inputs and the additional information submitted by the user to retrain the machine learning model. Thus, in some implementations, the machine learning model may be retrained using targeted feedback, such as when the machine learning model classifies an observation in the second cluster (e.g., "Maybe Qualifies") and additional information is submitted that changes the machine learning model's classification of the observation.

In this way, the machine learning system may apply a rigorous and automated process in connection with real-time event status via an enhanced graphical user interface. The machine learning system may enable recognition and/or identification of tens, hundreds, thousands, or millions of features and/or feature values for tens, hundreds, thousands, or millions of observations, thereby increasing accuracy and consistency and reducing delay associated with tracking a real-time event status via an enhanced graphical user interface relative to requiring computing resources to be allocated for tens, hundreds, or thousands of operators to manually track a real-time event status using the features or feature values.

As indicated above, FIG. 2 is provided as an example. Other examples may differ from what is described in connection with FIG. 2.

Figure 3:
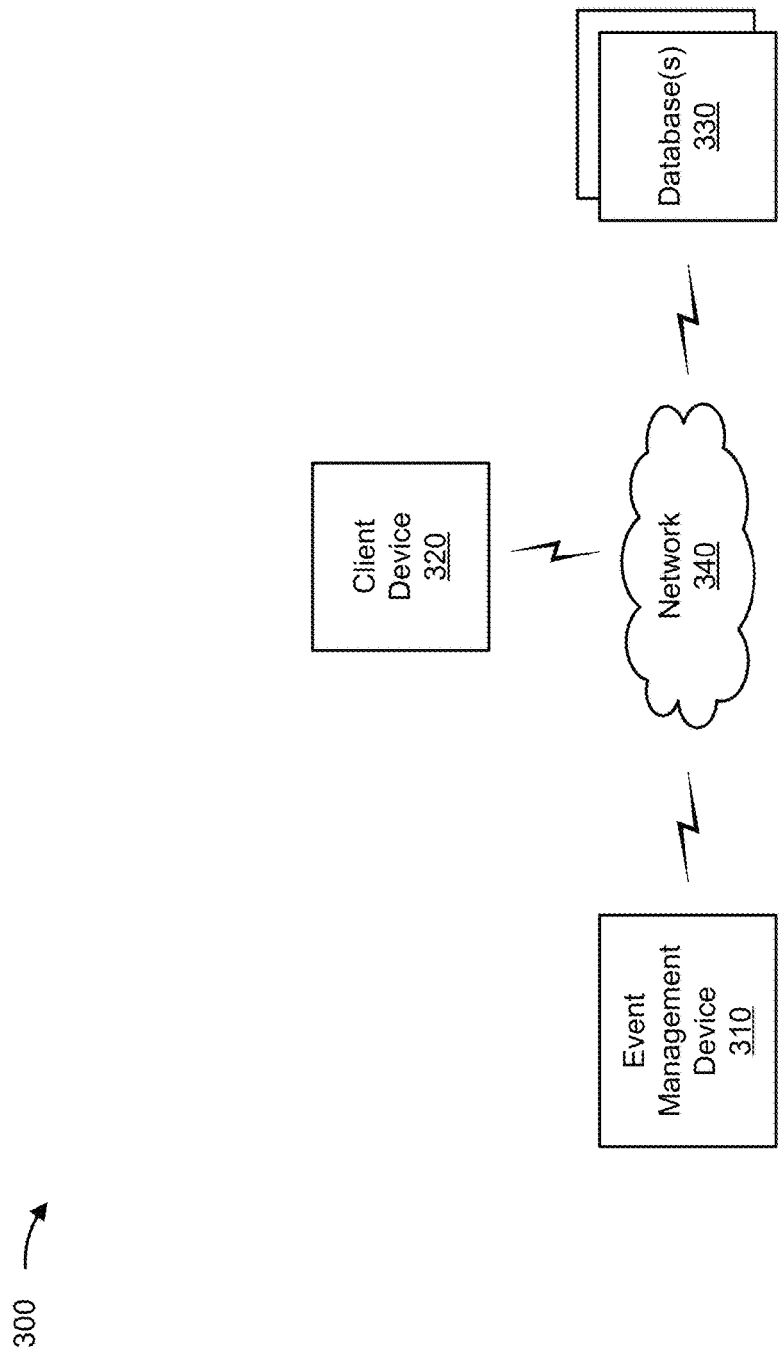
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an event management device 310, a client device 320, a database 330, and/or a network 340. Devices of environment 300 may interconnect via wired connections, wireless connections, or a combination of wired and wireless connections.

The event management device 310 may include one or more devices capable of receiving, generating, storing, processing, providing, and/or routing information associated with real-time event status via an enhanced graphical user interface, as described elsewhere herein. The event management device 310 may include a communication device and/or a computing device. For example, the event management device 310 may include a server, such as an application server, a client server, a web server, a database server, a host server, a proxy server, a virtual server (e.g., executing on computing hardware), or a server in a cloud computing system. In some implementations, the event management device 310 may include computing hardware used in a cloud computing environment.

The client device 320 may include one or more devices capable of receiving, generating, storing, processing, and/or providing information associated with real-time event status via an enhanced graphical user interface, as described elsewhere herein. The client device 320 may include a communication device and/or a computing device. For example, the client device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The database 330 (e.g., the event database and/or the user database) may include one or more devices capable of receiving, generating, storing, processing, and/or providing information associated real-time event status via an enhanced graphical user interface, as described elsewhere herein. The database 330 may include a communication device and/or a computing device. For example, the database 330 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the database 330 may store information associated with status information for respective events in a first format, as described elsewhere herein.

The network 340 may include one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
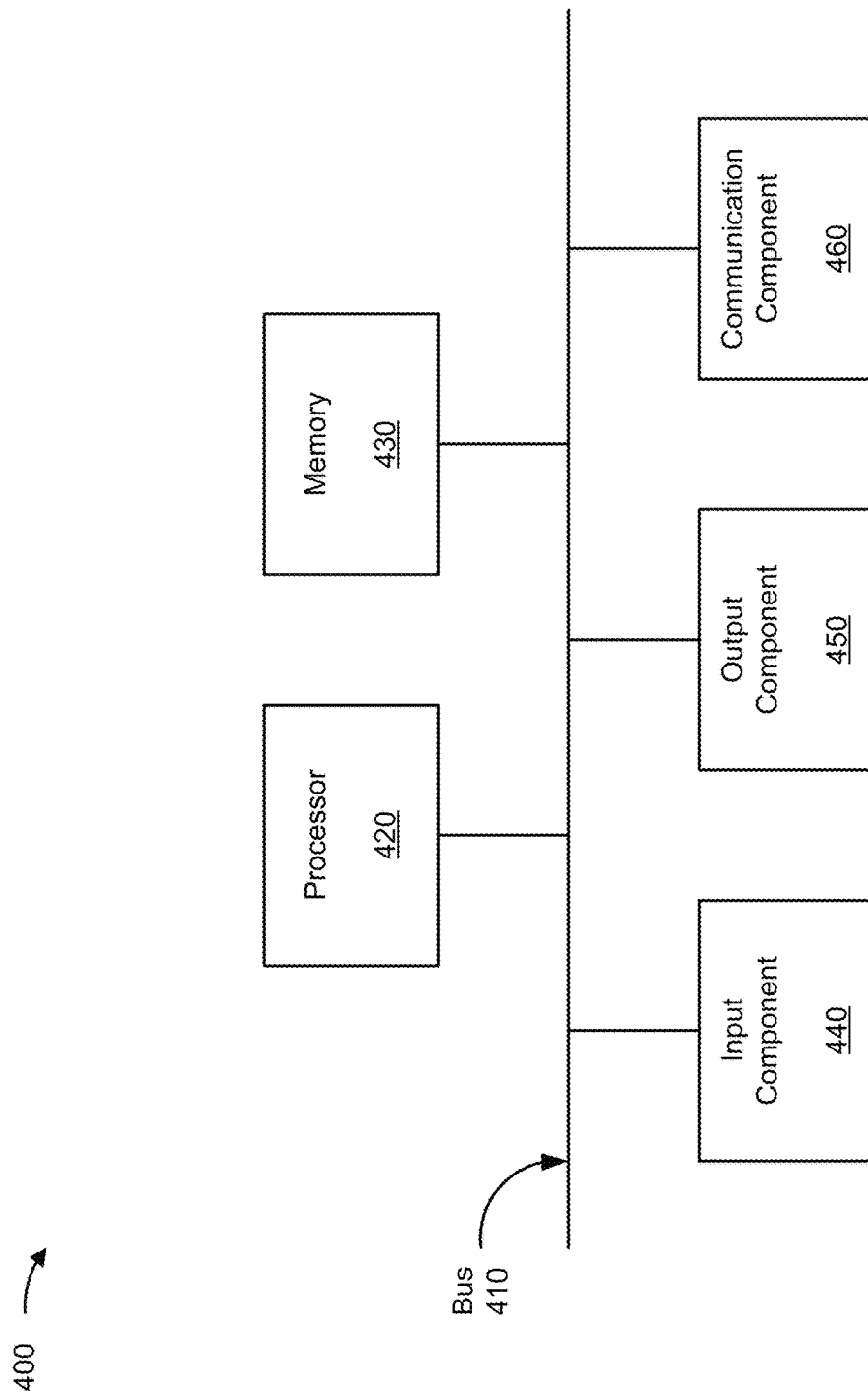
FIG. 4 is a diagram of example components of a device associated with real-time event status via an enhanced graphical user interface, in accordance with some embodiments of the present disclosure.

FIG. 4 is a diagram of example components of a device 400 associated with real-time event status via an enhanced graphical user interface. The device 400 may correspond to the event management device 310 and/or the client device 320. In some implementations, the event management device 310 and/or the client device 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
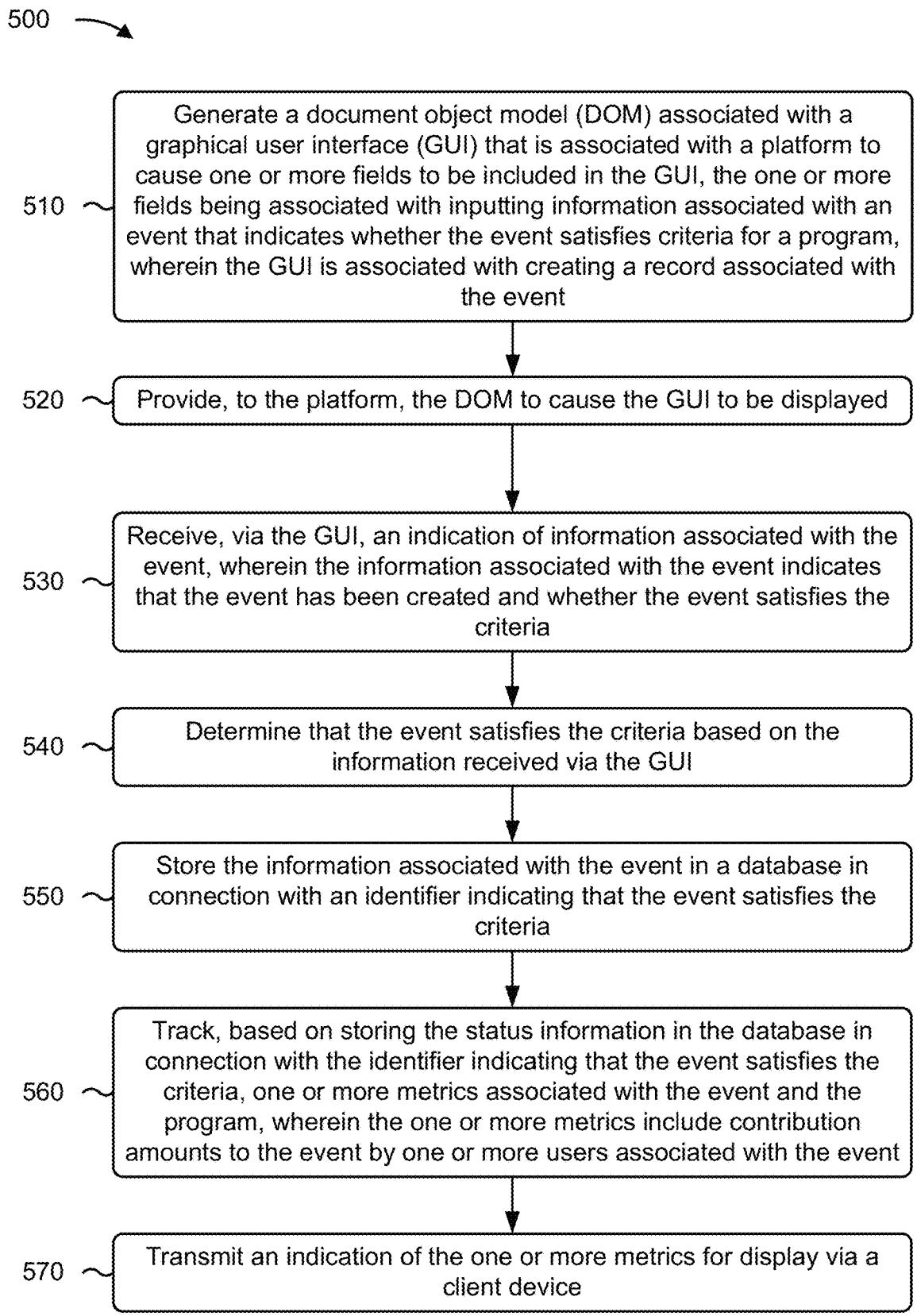
FIG. 5 is a flowchart of an example process associated with real-time event status via an enhanced graphical user interface, in accordance with some embodiments of the present disclosure.

FIG. 5 is a flowchart of an example process 500 associated with real-time event status via an enhanced graphical user interface. In some implementations, one or more process blocks of FIG. 5 may be performed by the event management device 310. In some implementations, one or more process blocks of FIG. 5 may be performed by another device or a group of devices separate from or including the event management device 310, such as the client device 320 and/or one or more of the databases 330. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include generating a DOM associated with a GUI that is associated with a platform to cause one or more fields to be included in the GUI, the one or more fields being associated with inputting information associated with an event that indicates whether the event satisfies criteria for a program (block 510). In some implementations, the GUI may be associated with creating a record associated with the event. For example, the event management device 310 (e.g., using processor 420 and/or memory 430) may generate a DOM associated with a GUI that is associated with a platform to cause one or more fields to be included in the GUI, the one or more fields being associated with inputting information associated with an event that indicates whether the event satisfies criteria for a program, as described above in connection with reference number 104 of FIG. 1A. As an example, the event management device may generate a DOM for a GUI in response to the client device requesting a resource associated with the platform (e.g., a GUI associated with the platform) from the event management device.

As further shown in FIG. 5, process 500 may include providing, to the platform, the DOM to cause the GUI to be displayed (block 520). For example, the event management device 310 (e.g., using processor 420 and/or memory 430) may provide, to the platform, the DOM to cause the GUI to be displayed, as described above in connection with reference number 106 of FIG. 1A. As an example, the event management device may transmit the indication of the DOM of the GUI in response to the client device requesting a resource (e.g., the GUI of the platform) from the event management device (e.g., when a user accesses the GUI).

As further shown in FIG. 5, process 500 may include receiving, via the GUI, an indication of information associated with the event (block 530). In some implementations, the information associated with the event may indicate that the event has been created and whether the event satisfies the criteria. For example, the event management device 310 (e.g., using processor 420, memory 430, input component 440, and/or communication component 460) may receive, via the GUI, an indication of information associated with the event, as described above in connection with reference number 120 of FIG. 1C. As an example, the client device may transmit, and the event management device may obtain, the information associated with the event that is input via the GUI in response to receiving an indication to create a record associated with the event.

As further shown in FIG. 5, process 500 may include determining that the event satisfies the criteria based on the information received via the GUI (block 540). For example, the event management device 310 (e.g., using processor 420 and/or memory 430) may determine that the event satisfies the criteria based on the information received via the GUI, as described above in connection with reference number 130 of FIG. 1C. As an example, if the event management device obtains, via an output of the machine learning model, a confidence score that satisfies a threshold, then the event management device may determine that the event satisfies the criteria of the program based on the confidence score satisfying the threshold.

As further shown in FIG. 5, process 500 may include storing the information associated with the event in a database in connection with an identifier indicating that the event satisfies the criteria (block 550). For example, the event management device 310 (e.g., using processor 420 and/or memory 430) may store the information associated with the event in a database in connection with an identifier indicating that the event satisfies the criteria, as described above in connection with reference number 134 of FIG. 1D. As an example, the event management device may transmit, and the event database may receive, the status information including the indicator that indicates whether the event qualifies for the program based on generating the status information.

As further shown in FIG. 5, process 500 may include tracking, based on storing the status information in the database in connection with the identifier indicating that the event satisfies the criteria, one or more metrics associated with the event and the program (block 560). In some implementations, the one or more metrics may include contribution amounts to the event by one or more users associated with the event. For example, the event management device 310 (e.g., using processor 420 and/or memory 430) may track, based on storing the status information in the database in connection with the identifier indicating that the event satisfies the criteria, one or more metrics associated with the event and the program, as described above in connection with reference number 142 of FIG. 1E and elsewhere herein. As an example, the event management device may track the one or more metrics by periodically obtaining, from the event database, an indication of events, including the event, that satisfy the criteria and aggregate contribution amounts associated with the events based on rate information and activity levels of users associated with the events (e.g., the event management device may aggregate status information associated with the events, such as the contribution amounts to calculate an aggregated amount associated with the events based on contributions by users to the event).

As further shown in FIG. 5, process 500 may include transmitting an indication of the one or more metrics for display via a client device (block 570). For example, the event management device 310 (e.g., using processor 420, memory 430, and/or communication component 460) may transmit an indication of the one or more metrics for display via a client device, as described above in connection with reference number 146 of FIG. 1E. As an example, the event management device may transmit an indication of a DOM of a metric GUI in response to an information package being generated. For example, the event management device may receive an indication when the information package is generated.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system comprising:
   one or more memories; and
   one or more processors, communicatively coupled to the one or more memories, configured to:
     store, in a database, status information that is indicative of whether respective events satisfy one or more criteria to qualify for a tax credit program, wherein the respective events include one or more of a task, a job, a team, an activity, or a project;
     indicate, via a platform and to a client device, a model of a graphical user interface (GUI) that includes one or more fields to input information, associated with an event, that is indicative of whether the event satisfies the one or more criteria;
     receive, via the GUI and the client device, an indication of the information associated with the event;
     determine whether the event qualifies for the tax credit program based on analyzing, using a machine learning model, the information associated with the event, wherein the machine learning model is trained using historical events that are designated as to whether the historical events qualify for the tax credit program;
     store status information associated with the event, and indicative of whether the event qualifies for the tax credit program, in the database;
     automatically generate, based on storing the status information associated with the event in the database, an information package associated with the event that is based on the information associated with the event, wherein the information package includes a tax credit amount calculated based on the status information and supporting information associated with the event; and
     provide, in a read-only format, the information package.

2. The system of claim 1, wherein the GUI is associated with the platform, and wherein the one or more processors, to indicate the GUI, are configured to:
   modify a document object model (DOM) associated with the GUI to cause the one or more fields to be included in the GUI; and
   provide, to the platform, the DOM that is modified to cause the one or more fields to be included in the GUI.

3. The system of claim 1, wherein the one or more processors are further configured to:
   detect that an input to the GUI indicates that the event satisfies the one or more criteria;
   provide, via the GUI, an indication to provide the supporting information associated with the event, wherein the supporting information includes one or more documents, one or more images, or one or more videos, indicating that the event satisfies the one or more criteria, and wherein the GUI includes one or more fields for inputting the supporting information; and
   obtain, via an input to the GUI, the supporting information.

4. The system of claim 1, wherein the one or more processors are further configured to:
   obtain, based on the information associated with the event, an indication of one or more users associated with the event;
   obtain rate information associated with respective users from the one or more users;
   obtain activity information associated with the respective users from the one or more users, wherein the activity information indicates amounts of time that the respective users contributed to the event; and
   calculate the tax credit amount based on the rate information and the activity information associated with the respective users from the one or more users.

5. The system of claim 1, wherein the one or more processors, to analyze the information associated with the event, are configured to:
   receive an input, via the GUI, via a field of the one or more fields indicating that the event satisfies the one or more criteria for the tax credit program; and
   generate information, to be stored in the database and in a first format, indicating that the event qualifies for the tax credit program.

6. The system of claim 1, wherein the one or more processors are further configured to:
   detect that an input to the GUI indicates that the event satisfies the one or more criteria;
   analyze the information associated with the event, including the input, that is input via the GUI to determine whether a confidence score associated with the information associated with the event satisfies a threshold, wherein the confidence score indicates a likelihood that the event satisfies the one or more criteria;
   modify a document object model (DOM) associated with the GUI to cause a field or a page associated with input requests for additional information associated with the event to be included in the GUI; and
   provide, to the platform, the DOM to cause the field or the page to be displayed via the GUI.

7. The system of claim 1, wherein the one or more processors are further configured to:
   aggregate status information, stored in the database, associated with events including the event;
   calculate an aggregated tax credit amount associated with the events, wherein the aggregated tax credit amount is based on contributions by users to the events and is based on the one or more criteria of the tax credit program; and
   provide, to another GUI and for display, an indication of the aggregated tax credit amount.

8. The system of claim 1, wherein the machine learning model is trained using a set of observations, each observation of the set of observations including a feature set that includes one or more variables associated with the one or more criteria.

9. A method for automatically obtaining and providing status information for events in real-time, comprising:
   generating, by a device, a document object model (DOM) associated with a graphical user interface (GUI) to cause one or more fields to be included in the GUI, the one or more fields for inputting information associated with an event that is indicative of whether the event satisfies one or more criteria to qualify for a tax credit program, wherein the GUI is associated with creating a record associated with the event, and wherein the event includes one or more of a task, a job, a team, an activity, or a project;

providing, by the device and via a platform, the DOM to cause the GUI to be displayed;

receiving, by the device and via the GUI, an indication of the information associated with the event;

determining, by the device and using a machine learning model, that the event qualifies for the tax credit program based on analyzing the information associated with the event, wherein the machine learning model is trained using historical events that are designated as to whether the historical events qualify for the tax credit program;

storing, by the device, the information associated with the event in a database in connection with an identifier indicating that the event qualifies for the tax credit program;

tracking, based on storing the status information in the database in connection with the identifier indicating that the event satisfies the one or more criteria, one or more metrics associated with the event and the tax credit program, wherein the one or more metrics include contribution amounts to the event by one or more users associated with the event; and transmitting, by the device, an indication of the one or more metrics for display via a client device.

10. The method of claim 9, wherein tracking the one or more metrics comprises:

periodically obtaining, from the database, an indication of events, including the event, that satisfy the one or more criteria;

aggregating contribution amounts associated with the events based on rate information and activity levels of users associated with the events; and determining a total contribution amount associated with the events based on aggregating the contribution amounts.

11. The method of claim 9, further comprising:

querying an employee database using an identifier associated with the event to obtain information associated with a set of users that are associated with the event; and determining the one or more users associated with the event based on roles associated with respective users, from the set of users, that are qualified for the tax credit program.

12. The method of claim 9, wherein the one or more metrics include a tax credit amount, and wherein tracking the one or more metrics comprises:

causing records, from an employee database, associated with the one or more users that are associated with the event to be provided to the device based on determining that the event satisfies the one or more criteria, wherein the records indicate pay information and activity information associated with respective users from the one or more users;

calculating the tax credit amount based on the pay information and activity information associated with the respective users; and storing, in the database, an indication of the tax credit amount.

13. The method of claim 12, wherein the records are updated in real-time, and wherein calculating the tax credit amount comprises:

receiving an update to the records indicating a change in at least one of pay information or activity information associated with a user of the one or more users; and calculating the tax credit amount based on receiving the update to the records.

14. The method of claim 9, wherein determining that the event satisfies the one or more criteria comprises:

providing the information associated with the event as an input to the machine learning model, wherein the information includes at least one of:

a user input indicating whether the event qualifies for the tax credit program, a description of the event, a name of the event, a team affiliation associated with the event, or one or more survey responses obtained via the GUI;

obtaining, via an output of the machine learning model, a confidence score indicating a likelihood that the event satisfies the one or more criteria; and determining whether the event satisfies the one or more criteria based on whether the confidence score satisfies a first threshold.

15. The method of claim 14, wherein determining whether the event satisfies the one or more criteria comprises:

determining that the confidence score does not satisfy the first threshold and does satisfy a second threshold, wherein the first threshold indicates a higher likelihood that the event satisfies the one or more criteria than the second threshold;

modifying, based on determining that the confidence score does not satisfy the first threshold and does satisfy the second threshold, the DOM associated with the GUI to cause a request for additional information associated with the event to be displayed via the GUI; and providing the DOM to the platform to cause the GUI and the request for additional information to be displayed.

16. The method of claim 9, wherein tracking the one or more metrics comprises:

obtaining, based on the information associated with the event, an indication of the one or more users associated with the event;

obtaining rate information associated with respective users from the one or more users;

obtaining activity information associated with the respective users from the one or more users, wherein the activity information indicates an amount of time that the respective users contributed to the event; and calculating a tax credit amount based on the rate information and the activity information associated with the respective users from the one or more users.

17. A non-transitory computer-readable medium storing a set of instructions, the set of instructions comprising:

one or more instructions that, when executed by one or more processors of a device, cause the device to:

provide, via a platform and for display, a graphical user interface (GUI) for display that includes a page having one or more fields for inputting information, associated with an event, that is indicative of whether the event satisfies one or more criteria to qualify for a tax credit program, and wherein the event includes one or more of a task, a job, a team, an activity, or a project;

receive, via the GUI and the one or more fields, an indication of the information associated with the event;

store an entry in a database that includes the information associated with the event and that includes an identifier indicating that the event qualifies for the tax credit program based on analyzing the information associated with the event using a machine learning model,
    wherein the machine learning model is trained using historical events that are designated as to whether the historical events qualify for the tax credit program;

obtain, based on storing the entry in the database, user information associated with one or more users that are associated with the event, wherein the user information includes at least one of salary information or activity level information;

calculate, based on storing the entry, a contribution amount associated with the event and the tax credit program, wherein calculating the contribution amount is based on the user information; and transmit an indication of the contribution amount for display.

18. The non-transitory computer-readable medium of claim 17, wherein the one or more instructions further cause the device to:

periodically obtain, from the database, an indication of events, including the event, that satisfy the one or more criteria;

aggregate contribution amounts associated with the events based on rate information and activity levels of users associated with the events; and determine a total contribution amount associated with the events based on aggregating the contribution amounts.

19. The non-transitory computer-readable medium of claim 17, wherein the one or more instructions further cause the device to:

provide the information associated with the event as an input to the machine learning model, wherein the information includes:

a user input indicating whether the event qualifies for the tax credit program, a description of the event, a team affiliation associated with the event, and one or more survey responses obtain via the GUI;

obtain, via an output of the machine learning model, a confidence score indicating a likelihood that the event satisfies the one or more criteria; and determine whether the event satisfies the one or more criteria based on whether the confidence score satisfies a first threshold.

20. The non-transitory computer-readable medium of claim 17, wherein the one or more instructions, to cause the device to calculate the contribution amount, cause the device to:

determine, based on the information associated with the event, the one or more users associated with the event based on roles associated with respective users that are associated with the event; and calculate the contribution amount based on the salary information and the activity level information associated with the respective users from the one or more users.

* * * * *